(12) United States Patent
Patel et al.

(10) Patent No.: US 9,964,674 B2
(45) Date of Patent: May 8, 2018

(54) RETROREFLECTIVE ARTICLES INCLUDING A SECURITY MARK

(71) Applicant: 3M INNOVATIVE PROPERTIES COMPANY, St. Paul, MN (US)

(72) Inventors: Suman K. Patel, Woodbury, MN (US); Bruce D. Orensteen, St. Paul, MN (US); Mikhail L. Pekurovsky, Bloomington, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 10 days.

(21) Appl. No.: 14/344,794

(22) PCT Filed: Sep. 21, 2012

(86) PCT No.: PCT/US2012/056525
§ 371 (c)(1),
(2) Date: Mar. 13, 2014

(87) PCT Pub. No.: WO2013/044000
PCT Pub. Date: Mar. 28, 2013

(65) Prior Publication Data
US 2015/0043074 A1    Feb. 12, 2015

Related U.S. Application Data

(60) Provisional application No. 61/538,575, filed on Sep. 23, 2011.

(51) Int. Cl.
*G02B 5/124* (2006.01)
*B32B 37/24* (2006.01)
(Continued)

(52) U.S. Cl.
CPC .......... *G02B 5/124* (2013.01); *B32B 37/24* (2013.01); *B42D 25/324* (2014.10);
(Continued)

(58) Field of Classification Search
CPC . G02B 5/08; G02B 5/04; G02B 5/122; G02B 5/124; G02B 5/128; G02B 5/136;
(Continued)

(56) References Cited

U.S. PATENT DOCUMENTS 4,688,894 A    8/1987   Hockert
5,591,527 A    1/1997   Lu
(Continued)

FOREIGN PATENT DOCUMENTS

EP    0416742    3/1991
EP    0 583 424 B1    10/1997
(Continued)

OTHER PUBLICATIONS

D. G. Dikobe, et al., "Morphology and properties of polypropylene/ethylene vinyl acetate coplyme/wood powder blend composites" eXPRESS Polymer Letter vol. 3, No. 3 (2009) 190-199.*
(Continued)

*Primary Examiner* — William R Alexander
*Assistant Examiner* — Ephrem Mebrahtu
(74) *Attorney, Agent, or Firm* — Trisha D. Adamson

(57) ABSTRACT

The present disclosure relates to prismatic retroreflective articles that includes a security mark and to methods of making such articles.

30 Claims, 2 Drawing Sheets

(51) Int. Cl.
  *B42D 25/30* (2014.01)
  *B42D 25/324* (2014.01)
  *B42D 25/46* (2014.01)
  *B42D 25/382* (2014.01)
  *B42D 25/47* (2014.01)
  *G07D 7/00* (2016.01)

(52) U.S. Cl.
  CPC ............ *B42D 25/382* (2014.10); *B42D 25/46* (2014.10); *B42D 25/47* (2014.10); *G07D 7/003* (2017.05); *Y10T 156/10* (2015.01)

(58) Field of Classification Search
  CPC . G02B 5/208; G06K 9/00; G06K 9/18; G06K 9/74; G06K 19/06; G06K 19/06009; G06K 19/14; B42D 15/10
  USPC .......................... 359/529, 530, 833; 235/494
  See application file for complete search history.

(56) References Cited

U.S. PATENT DOCUMENTS

| | | | |
|---|---|---|---|
| 5,614,286 A | 3/1997 | Bacon, Jr. | |
| 5,885,677 A | 3/1999 | Gosselin | |
| 6,568,817 B1 | 5/2003 | Mimura | |
| 6,677,030 B2 | 1/2004 | Thakkar | |
| 6,758,405 B2* | 7/2004 | Look | G02B 5/128 235/494 |
| 7,422,334 B2 | 9/2008 | Smith | |
| 7,667,895 B2* | 2/2010 | Argoitia | B42D 25/328 359/566 |
| 7,995,278 B2 | 8/2011 | Endle | |
| 8,177,374 B2 | 5/2012 | Wu | |
| 2003/0111542 A1 | 6/2003 | Look | |
| 2011/0211257 A1 | 9/2011 | Hannington | |

FOREIGN PATENT DOCUMENTS

| | | |
|---|---|---|
| EP | 0 583 424 B1 | 10/1997 |
| EP | 0 790 896 B1 | 3/1999 |
| EP | 2343198 | 7/2011 |
| WO | WO 99/36806 A1 | 7/1999 |
| WO | WO 2011-129832 | 10/2011 |
| WO | WO 2013-043827 | 3/2013 |

OTHER PUBLICATIONS

Light Transmission and Reflectance of Acrylite.*
International Search Report for PCT international Application No. PCT/US2012/056525, dated Mar. 8, 2013, 4pgs.

* cited by examiner

RETROREFLECTIVE ARTICLES INCLUDING A SECURITY MARK

BACKGROUND

Retroreflective materials are characterized by the ability to redirect light incident on the material back toward the originating light source. This property has led to the widespread use of retroreflective sheeting for a variety of traffic and personal safety uses. Retroreflective sheeting is commonly employed in a variety of articles, for example, road signs, barricades, license plates, pavement markers and marking tape, as well as retroreflective tapes for vehicles and clothing.

Two known types of retroreflective sheeting are optical element sheeting (e.g., cube corner sheeting) and microsphere-based sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Cube corner retroreflective sheeting, sometimes referred to as "prismatic" sheeting, typically comprises a thin transparent layer having a substantially planar first surface and a second structured surface comprising a plurality of geometric structures, some or all of which include three reflective faces configured as a cube corner element.

A cube corner element can include three mutually perpendicular optical faces that intersect at a single apex. Generally, light that is incident on a corner cube element from a light source is totally internally reflected from each of the three perpendicular cube corner optical faces and is redirected back toward the light source.

Security marks are used to indicate that an article is authentic. Security marks have been used on beaded retroreflective sheeting. For example, U.S. Pat. No. 4,688,894 describes a security mark for use on beaded retroreflective sheeting having the ability to be optically variable based on viewing angle. U.S. Pat. No. 7,995,278 describes a security mark for use on beaded retroreflective sheeting that appears to float or sink along the article sheeting surface.

BRIEF SUMMARY

The inventors of the present application recognized a need for security marks capable of use on prismatic retroreflective sheeting. The present disclosure relates to prismatic retroreflective articles that includes a security mark and to methods of making such articles.

Another illustrative embodiment is a retroreflective article, comprising: a retroreflective layer including multiple cube corner elements that collectively form a structured surface; one or more barrier layers positioned adjacent to the structured surface; a conforming layer positioned adjacent to the one or more barrier layers; and one or more security mark layers positioned between the conforming layer and the cube corner elements.

In some embodiments, the one or more security mark layers are positioned between the barrier layer and the structured surface. In some embodiments, the one or more security mark layers are positioned directly between the conforming layer and the cube corner elements. In some embodiments, the one or more security mark layers are positioned between the barrier layer and the conforming layer. In some embodiments, the one or more security mark layers, the conforming layer, and the one or more barrier layers each have a characteristic and wherein that characteristic is not the same for all three layers, and wherein that characteristic is one of color and infra-red absorbency. In some embodiments, at least some of the one or more barrier layers and at least some of the one or more security mark layers overlap. In some embodiments, the one or more barrier layers and one or more security mark layers do not overlap. In some embodiments, the one or more security mark layers are applied to at least a portion of the conforming layer. In some embodiments, the one or more security mark layers are applied to at least a portion of the structured surface. In some embodiments, the one or more security mark layers cover less than 100% of the structured surface. In some embodiments, a portion of the structured surface adjacent to the one or more security mark layers is not retroreflective and a portion of the structured surface adjacent to the one or more barrier layers is retroreflective. In some embodiments, the conforming layer is an adhesive. In some embodiments, the adhesive is optically opaque. In some embodiments, at least a portion of the one or more security mark layers can be distinguished from the background by a viewer in both ambient light and in retroreflection. In some embodiments, at least a portion of the one or more security mark layers can be distinguished from the background by a viewer in ambient, but not in retroreflection.

Another illustrative embodiment is a method of forming a retroreflective article, comprising: providing a retroreflective layer including multiple cube corner elements that collectively form a structured surface; positioning one or more barrier layers adjacent to the structured surface; positioning a conforming layer adjacent to the one or more barrier layers; positioning a security mark layer between the structured surface and the conforming layer; and laminating the layers.

In some embodiments, the one or more security mark layers are positioned between the barrier layer and the structured surface. In some embodiments, the one or more security mark layers are positioned directly between the conforming layer and the cube corner elements. In some embodiments, the one or more security mark layers are positioned between the barrier layer and the conforming layer. In some embodiments, the method further comprises forming a pattern of the one or more barrier layers and/or the one or more security mark layers before the laminating step. In some embodiments, the method further comprises (1) patterning the one or more barrier layers and/or the one or more security mark layers onto the conforming layer before the laminating step to form a security mark void; and (2) patterning another barrier layer and/or security mark layer into the security mark void, wherein the barrier layer and the security mark layer do not substantially overlap. In some embodiments, at least some of the one or more security mark layers and/or at least some of the one or more barrier layers is formed by curing a polymer-containing layer before the laminating step. In some embodiments, at least some of the one or more security mark layers and/or at least some of one or more barrier layers is printed onto the conforming layer. In some embodiments, at least a portion of the one or more security mark layers can be distinguished from the background by a viewer in both ambient light and in retroreflection. In some embodiments, at least a portion of the one or more security mark layers can be distinguished from the background by a viewer in ambient light, but not in retroreflection. In some embodiments, the confirming layer is an adhesive. In some embodiments, the adhesive is a pressure sensitive adhesive. In some embodiments, the adhesive is optically opaque. In some embodiments, the security mark exhibits variable retroreflectivity. In some embodiments, the one or more security mark layers have a characteristic that varies from a characteristic in one of (1) the one or more barrier layers or (2) the conforming layer.

Another illustrative embodiment is a retroreflective article comprising: a retroreflective layer including multiple cube corner elements that collectively form a structured surface; a conforming layer; and one or more security mark layers positioned between the conforming layer and the cube corner elements.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

The present disclosure relates to prismatic retroreflective articles that includes a security mark and to methods of making such articles. The term "security mark" refers to an element on or in a retroreflective film that can be used to authenticate the article. The security marks of the present application can be continuous or discontinuous. For purposes of simplicity, the terminology used herein represents a situation in which when a license plate is viewed, the viewer sees a background area and a security mark area. Those of skill in the art will appreciate that the background area can include numerous colors or other optical effects.

Figure 1A:
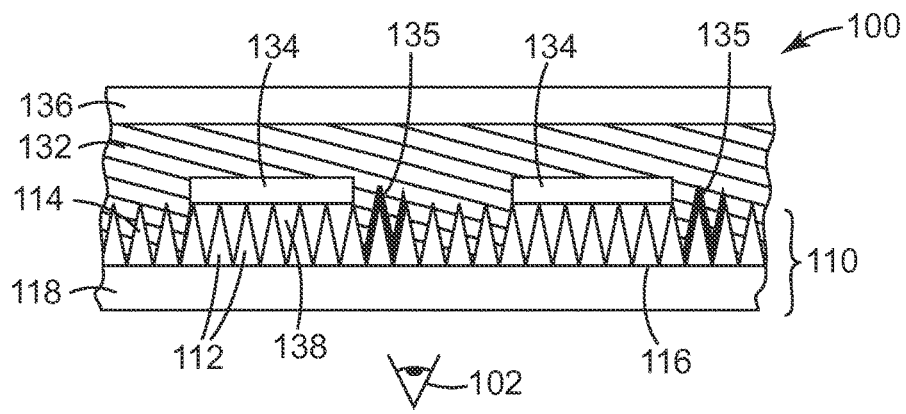
FIGS. 1A and 1B are schematic side views of one exemplary embodiment of a retroreflective article.
Figure 1B:
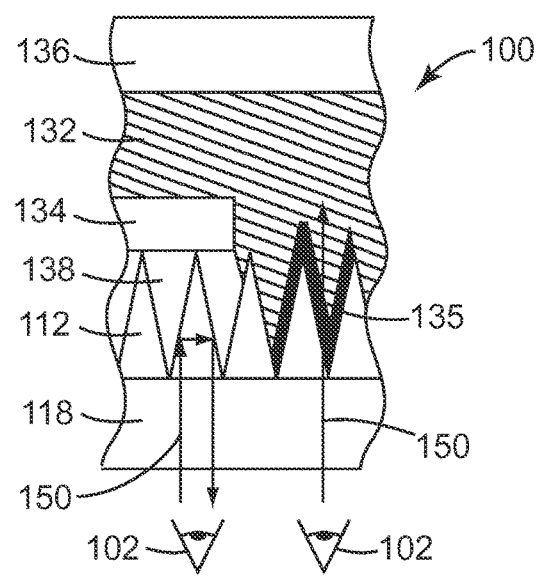

FIGS. 1A and 1B are schematic side views of one exemplary embodiment of a retroreflective article 100 that faces a viewer 102. Retroreflective article 100 includes a retroreflective layer 110 including multiple cube corner elements 112 that collectively form a structured surface 114 opposite a major surface 116. The specific retroreflective layer 110 shown in FIGS. 1A and 1B includes an overlay layer 118 (also referred to as a top film), but those of skill will appreciate that some embodiments do not include an overlay layer. One or more barrier layers 134 are positioned between retroreflective layer 110 and conforming layer 132. Barrier layers 134 form a physical "barrier" between cube corner elements 112 and conforming layer 132. Barrier layer 134 can directly contact or be spaced apart from or can push slightly into the tips of cube corner elements 112.

In general, any material that prevents the conforming layer material from contacting cube corner elements 112 or flowing or creeping into low refractive index area 138 can be used to form the barrier layer. The portions of structured surface 112 that are adjacent to low refractive index area 138, which is created, in part, by barrier layers 134, are typically retroreflective. Exemplary materials for use in barrier layer 134 include resins, polymeric materials, dyes, inks (including color-shifting inks), vinyl, inorganic materials, UV-curable polymers, multi-layer optical films (including, for example, color-shifting multi-layer optical films), pigments, particles, and beads. The size and spacing of the one or more barrier layers can be varied.

In some embodiments, the barrier layers may form a pattern on the retroreflective sheeting. In some embodiments, one may wish to reduce the visibility of the pattern on the sheeting. This can be accomplished, for example, by using barrier layers that are relatively small and difficult to resolve at a specific distance. In general, any desired pattern can be generated by combinations of the described techniques, including, for example, indicia such as letters, words, alphanumerics, symbols, graphics, logos, or pictures. The patterns can also be continuous, discontinuous, monotonic, dotted, serpentine, any smoothly varying function, stripes, varying in the machine direction, the transverse direction, or both; the pattern can form an image, logo, or text, and the pattern can include patterned coatings and/or perforations. The pattern can include, for example, an irregular pattern, a regular pattern, a grid, words, graphics, images lines, and intersecting zones that form cells.

A low refractive index area 138 is positioned between (1) one or both of barrier layer 134 and conforming layer 132 and (2) cube corner elements 112. The low refractive index area 138 facilitates total internal reflection such that light that is incident on cube corner elements 112 adjacent to a low refractive index area 138 is retroreflected. As is shown in FIG. 1B, a light ray 150 incident on a cube corner element 112 that is adjacent to low refractive index layer 138 is retroreflected back to viewer 102. For this reason, an area of retroreflective article 100 that includes low refractive index layer 138 can be referred to as an optically active area. In contrast, an area of retroreflective article 100 that does not include low refractive index layer 138 can be referred to as an optically inactive area because it does not substantially retroreflect incident light. As used herein, the term "optically inactive area" refers to an area that is at least 50% less optically active (e.g., retroreflective) than an optically active area. In some embodiments, the optically inactive area is at least 40% less optically active, or at least 30% less optically active, or at least 20% less optically active, or at least 10% less optically active, or at least at least 5% less optically active than an optically active area.

Low refractive index layer 138 includes a material that has a refractive index that is less than about 1.30, less than about 1.25, less than about 1.2, less than about 1.15, less than about 1.10, or less than about 1.05. In general, any material that prevents the conforming layer material from contacting cube corner elements 112 or flowing or creeping into low refractive index area 138 can be used as the low refractive index material. In some embodiments, barrier layer 134 has sufficient structural integrity to prevent conforming layer 132 from flowing into a low refractive index area 138. In such embodiments, low refractive index area may include, for example, a gas (e.g., air, nitrogen, argon, and the like). In other embodiments, low refractive index area includes a solid or liquid substance that can flow into or be pressed into or onto cube corner elements 112. Exemplary materials include, for example, ultra-low index coatings (those described in PCT Patent Application No. PCT/US2010/031290), and other highly porous materials.

The portions of conforming layer 132 that are adjacent to or in contact with cube corner elements 112 form optically inactive (e.g., non-retroreflective) areas or cells. In some embodiments, conforming layer 132 is optically opaque. In some embodiments conforming layer 132 has a white color.

In some embodiments, conforming layer 132 is an adhesive. Exemplary adhesives include those described in PCT Patent Application No. PCT/US2010/031290. Where the conforming layer is an adhesive, the conforming layer may assist in holding the entire retroreflective construction together and/or the viscoelastic nature of barrier layers 134 may prevent wetting of cube tips or surfaces either initially during fabrication of the retroreflective article or over time.

In some embodiments, conforming layer 132 is a pressure sensitive adhesive. The PSTC (pressure sensitive tape council) definition of a pressure sensitive adhesive is an adhesive that is permanently tacky at room temperature which adheres to a variety of surfaces with light pressure (finger pressure) with no phase change (liquid to solid). While most adhesives (e.g., hot melt adhesives) require both heat and pressure to conform, pressure sensitive adhesives typically only require pressure to conform. Exemplary pressure sensitive adhesives include those described in U.S. Pat. No. 6,677,030. Barrier layers 134 may also prevent the pressure sensitive adhesive from wetting out the cube corner sheeting.

Retroreflective layer 110 of FIGS. 1A and 1B is shown as including overlay layer 118 and no land layer or land portion. The term "land layer" as used in the present application refers to a continuous layer of material coextensive with the cube corner elements and composed of the same material. Those of skill in the art will appreciate that retroreflective layer 110 can include a land layer or land portion. A construction without a land layer may be desirable for flexible embodiments.

In some embodiments, conforming layer 132 includes a sealing film 136 that assists in holding the construction together. Some sealing films require heat and pressure to conform.

A security mark layer 135 is positioned adjacent to cube corner elements 112 to form a security mark that is visible under ambient light but not under retroreflection. Security mark layer 135 does not create a low refractive index area 138 between security mark layer 135 and the cube corner elements 112. As a result, the portion of structured surface 114 that is directly adjacent to the security mark layer is not retroreflective. However, the portion of the structured surface that is directly adjacent to the security mark layer has a different characteristic (e.g., color or infra-red absorbency) than the background of the license plate. In some embodiments, security mark layers 135 can be positioned so that they do not substantially overlap effective barriers 134.

In some embodiments, at least a portion of security mark layer 135 overlaps with at least a portion of barrier layer 134. One such implementation of this is shown, for example, in FIG. 2. In this specific implementation, the portion of structured surface 114 that is adjacent to a low refractive index area 138 is retroreflective. The portion of structured surface 114 that is adjacent to a security mark layer 135 but is not adjacent to a low refractive index area 138 is not retroreflective. The portion of structured surface 114 that is adjacent to a barrier layer 134 and a security mark layer 135 (but is not adjacent to a low refractive index area 138) is not retroreflective and has a color that differs from the color of the area adjacent to a low refractive index area 138 and a barrier layer 134. If present, the portion of structured surface 114 that is adjacent to a low refractive index area 138, a barrier layer 134, and security mark layer 135 is retroreflective and has a color that is a combination of any color present in the barrier layer 134 and the security mark layer 135.

In some embodiments, the security mark layer 135 is in intimate contact with the structured surface 114 and separates the conforming layer 132 from the structured surface 114. In some embodiments, the security mark layer 135 (and thus the security mark formed by this layer) has a color that is different than the color of the barrier layer and/or the background. In some embodiments, the security mark layer 135 (and thus the security mark formed by this layer) has an infra-red absorbency that is different than the infra-red absorbency of the barrier layer and/or the background.

For example, in one exemplary implementation, a retroreflective article includes a red barrier layer and a red security mark layer. The portion of the article with the red barrier layer retroreflects incident light, and the portion of the article with only the red security mark layer does not retroreflect incident light. Consequently, the security mark formed by the security mark layer "disappears" in retroreflection. In some embodiments, where the desired end effect is for the two security marks to look identical in ambient light, one might use two shades of red in order to make the two areas look identical in ambient light.

In some embodiments, where the desired end effect is for the two security marks to look different in both ambient and retroreflection, one might use two completely different colors for the barrier layer material and the security mark layer material. For example, an exemplary retroreflective article could include a red security mark layer and a white barrier layer. The red security mark layer would be visible in ambient light, but only the white barrier layer would retroreflect incident light and be observed in retroreflection (e.g., would appear bright when viewed by a retroviewer).

Figure 2:
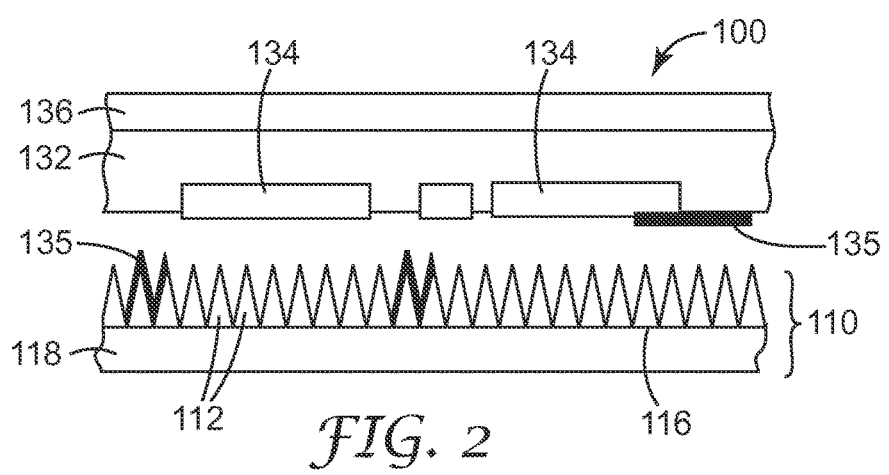
FIG. 2 is schematic drawing of one exemplary intermediary step in forming the retroreflective article of FIGS. 1A and 1B.

One embodiment is schematically shown in FIG. 2, which shows one method of making at least some of the retroreflective articles of the present disclosure. This method involves placing barrier layer(s) 134 onto a conforming layer 132, placing security marking layer(s) 135 on either the conforming layer 132 and/or the cube corner elements 112, and then laminating the resulting conforming layer 132 to the retroreflective layer 110. The amount of flow and conformance to structured surface 114 that the security mark layers 135 exhibit will depend on such things as, for example, the layer thickness and the rheological characteristics of the materials used. In some embodiments, the security mark layer 135 is cured after lamination to the structured surface 114 to minimize flow and conformance to the structured surface 114. In some embodiments, minimal or no flow and conformance occurs, even without curing after lamination.

The pressure sensitive adhesive layer 132 can be formed in a variety of ways including but not limited to the following exemplary methods. In one exemplary embodiment, the material(s) forming the barrier layer and/or the security mark layer are printed onto the pressure sensitive adhesive and/or the cube corner elements. The method of printing can be, a non-contact method such as, for example, printing using an inkjet printer. The method of printing can be a contact printing method such as, for example, flexographic printing. In another exemplary embodiment, the material(s) forming the barrier layer and/or the security marking layer are printed onto a flat release surface using, for example, an inkjet or screen printing method, and are then subsequently transferred from the flat release surface onto the pressure sensitive adhesive and/or cube corner elements. In another exemplary embodiment, the material(s) forming the barrier layer and/or the security mark layer are flood coated onto a microstructured surface. The barrier layer material and/or security marking layer are subsequently transferred from the microstructured surface to the pressure sensitive adhesive by, for example, lamination. The structured surface is removed after lamination to provide a pressure sensitive adhesive with barrier layers that is laminated to a retroreflective layer to make the retroreflective article. The retroreflective article may then, optionally, be adhesively bonded to a substrate (e.g., an aluminum substrate) to form, for example, a license plate or signage.

In some embodiments, the barrier layer 134 is placed on the pressure sensitive adhesive material 132 and then cured before lamination to the structured surface. Following the curing step, the security mark layer can be applied to the pressure sensitive adhesive material 132 and then the assembled pressure sensitive adhesive material 132 can be laminated to the structured surface to form the retroreflective article.

In some embodiments, barrier layer material 134 is applied and cured on the conforming layer 132. The cured barrier layer 134 would be visible under retroreflection and under ambient light. Then a security mark layer 135 is applied and not cured. This non-cured security mark layer 135 would not be visible under retroreflection and would be visible under ambient light.

Alternatively, a security mark layer 135 that includes a material that would typically cure and form a barrier layer 134 could be formulated to not be curable (such as, for example, formulated without an initiator or a crosslinking agent). If such a material was used as a security mark layer 135, it could be applied before or after the other layers are cured.

Figure 3:
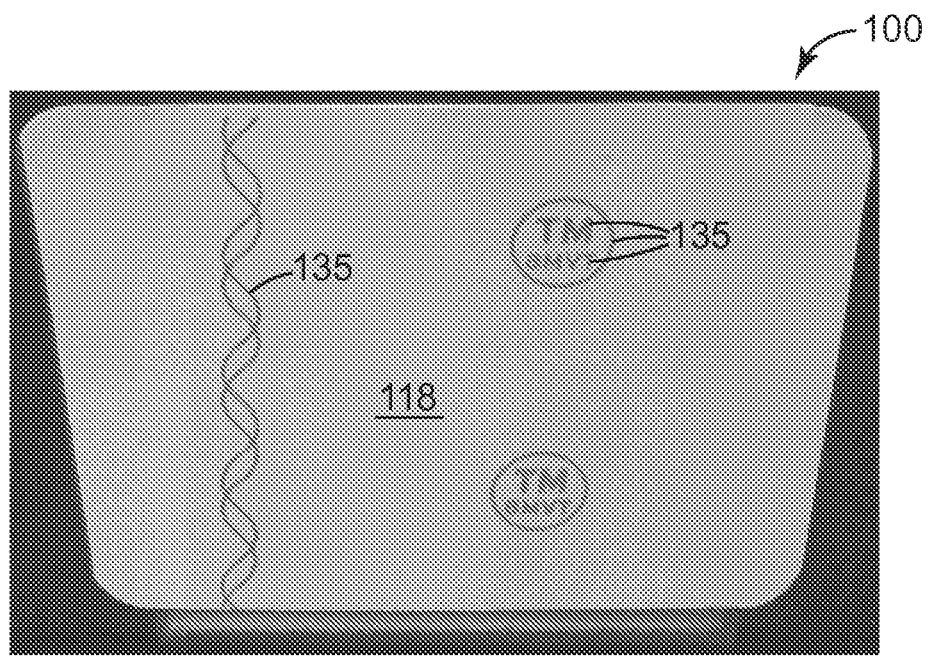
FIG. 3 is a front view of an illustrative retroreflective article with security markings.
Figure 4:
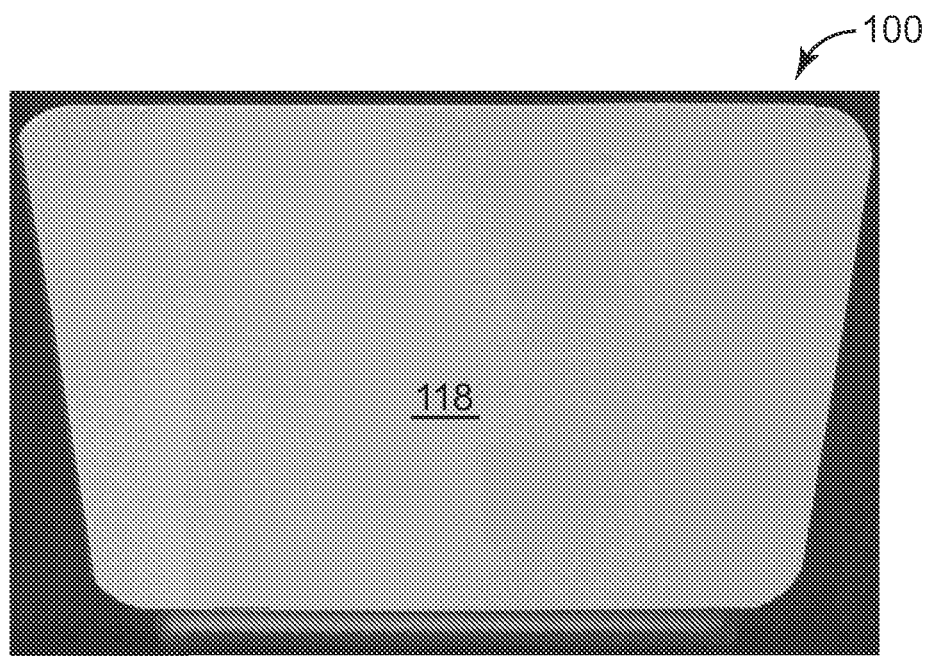
FIG. 4 is a front view of the illustrative retroreflective article of FIG. 3 under retroreflection.

FIG. 3 is a front view of an illustrative retroreflective article 100 with security markings 135. The retroreflective article 100 shown has a white opaque retroreflective background and a black security indicia or markings 135. Under ambient light the black security indicia or markings 135 appear black and under retroreflection (see FIG. 4) the black security indicia or markings 134 disappear as compared to the surrounding background.

In many embodiments, the barrier layer 134 and the security marking layer 135 do not have the same color. In some embodiments, the barrier layer 134 is clear or colorless and in other embodiments, the barrier layer 134 and the pressure sensitive adhesive layer 132 have the same color (e.g., white). The security marking layer 135 can have a color that is different than either the pressure sensitive adhesive layer 132 or the barrier layer 134 and the pressure sensitive adhesive layer 132.

All references mentioned herein are incorporated by reference.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if a cell depicted in the figures is turned over or flipped over, portions previously described as below or beneath other elements would then be above those other elements.

Embodiments of the present disclosure are disclosed. The disclosed embodiments are presented for purposes of illustration and not limitation. The implementations described above and other implementations are within the scope of the following claims. One skilled in the art will appreciate that the present disclosure can be practiced with embodiments other than those disclosed. Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the present disclosure. The scope of the present application should, therefore, be determined only by the following claims.

What is claimed is:

1. A retroreflective article, comprising:
a retroreflective layer comprising multiple cube corner elements that collectively form a structured surface;
one or more barrier layers positioned adjacent to the structured surface to form a low refractive index area between the one or more barrier layers and the cube corner elements having a refractive index of less than 1.3;
an opaque conforming layer positioned adjacent to the one or more barrier layers; and
one or more security mark layers positioned between the conforming layer and the cube corner elements;
wherein the barrier layers, conforming layer, and security mark layers each have a characteristic, wherein the characteristic is not the same for the barrier layers and the security mark layers, and wherein the characteristic is at least one of color or infra-red absorbency.

2. The retroreflective article of claim 1, wherein the one or more security mark layers are positioned between the barrier layer and the structured surface.

3. The retroreflective article of claim 1, wherein the one or more security mark layers are positioned directly between the conforming layer and the cube corner elements.

4. The retroreflective article of claim 1, wherein at least one of the one or more security mark layers has a first portion positioned between the barrier layer and the cube corner elements and a second portion positioned between the cube corner elements and the conforming layer.

5. The retroreflective article of claim 1, wherein at least some of the one or more barrier layers and at least some of the one or more security mark layers overlap.

6. The retroreflective article of claim 1, wherein the one or more barrier layers and one or more security mark layers do not overlap.

7. The retroreflective article of claim 1, wherein the one or more security mark layers are applied to at least a portion of the conforming layer.

8. The retroreflective article of claim 1, wherein the one or more security mark layers are applied to at least a portion of the structured surface.

9. The retroreflective article of claim 1, wherein the one or more security mark layers cover less than 100% of the structured surface.

10. The retroreflective article of claim 1, wherein a portion of the structured surface adjacent to the one or more security mark layers is not retroreflective and a portion of the structured surface adjacent to the one or more barrier layers is retroreflective.

11. The retroreflective article of claim 1, wherein the conforming layer is an adhesive.

12. The retroreflective article of claim 1, wherein at least a portion of the one or more security mark layers can be distinguished from a background by a viewer in both ambient light and in retroreflection.

13. The retroreflective article of claim 1, wherein at least a portion of the one or more security mark layers can be distinguished from a background by a viewer in ambient, but not in retroreflection.

14. The retroreflective article of claim 1, wherein the one or more security mark layers have a characteristic that varies from a characteristic in one of (1) the one or more barrier layers or (2) the conforming layer.

15. The retroreflective article of claim 1, wherein the conforming layer is white.

16. A method of forming a retroreflective article, comprising:
providing a retroreflective layer comprising multiple cube corner elements that collectively form a structured surface;
positioning one or more barrier layers adjacent to the structured surface to form a low refractive index area between the one or more barrier layers and the cube corner elements having a refractive index of less than 1.3;
positioning an opaque conforming layer adjacent to the one or more barrier layers;
positioning a security mark layer between the structured surface and the conforming layer, wherein the barrier layers, conforming layer, and security mark layers each have a characteristic, wherein the characteristic is not the same for the barrier layers and the security mark layers, and wherein the characteristic is at least one of color or infra-red absorbency; and
laminating the layers.

17. The method of claim 16, wherein the conforming layer is white.

18. The method of claim 16, wherein the one or more security mark layers are positioned between the barrier layer and the structured surface.

19. The method of claim 16, wherein the one or more security mark layers are positioned directly between the conforming layer and the cube corner elements.

20. The method of claim 16, wherein at least one of the one or more security mark layers has a first portion positioned between the barrier layer and the cube corner elements and a second portion positioned between the cube corner elements and the conforming layer.

21. The method of claim 16, further comprising:
forming a pattern of the one or more barrier layers and/or the one or more security mark layers before the laminating step.

22. The method of claim 16, further comprising:
patterning the one or more barrier layers and/or the one or more security mark layers onto the conforming layer before the laminating step to form a security mark void.

23. The method of claim 16, wherein at least some of the one or more security mark layers and/or at least some of the one or more barrier layers is formed by curing a polymer-containing layer before the laminating step.

24. The method of claim 16, wherein at least some of the one or more security mark layers and/or at least some of one or more barrier layers is printed onto the conforming layer.

25. The method of claim 16, wherein at least a portion of the one or more security mark layers can be distinguished from the background by a viewer in both ambient light and in retroreflection.

26. The method of claim 16, wherein at least a portion of the one or more security mark layers can be distinguished from the background by a viewer in ambient light, but not in retroreflection.

27. The method of claim 16, wherein the conforming layer is an adhesive.

28. The method of claim 16, wherein the security mark exhibits variable retroreflectivity.

29. The method of claim 16, wherein the one or more security mark layers have a characteristic that varies from a characteristic in one of (1) the one or more barrier layers or (2) the conforming layer.

30. A retroreflective article, comprising:
a retroreflective layer comprising multiple cube corner elements that collectively form a structured surface;
one or more barrier layers positioned adjacent to the structured surface to form a low refractive index area between the one or more barrier layers and the cube corner elements having a refractive index of less than 1.3;
a conforming layer positioned adjacent to the one or more barrier layers; and
one or more security mark layers positioned between the conforming layer and the cube corner elements;
wherein the barrier layers, conforming layer, and security mark layers each have a characteristic, wherein the characteristic is not the same for the barrier layers and the security mark layers, and wherein the characteristic is at least one of color or infra-red absorbency.

* * * * *